(12) United States Patent
Clauss et al.

(10) Patent No.: US 6,503,135 B2
(45) Date of Patent: Jan. 7, 2003

(54) GRINDING DEVICE

(75) Inventors: Steffen Clauss, Rieschweiler-Muhlbach (DE); Stanley Jerome Johnson, Cedar Falls, IA (US)

(73) Assignee: Deere & Company, Moline, IL (US)

( * ) Notice: Subject to any disclaimer, the term of this patent is extended or adjusted under 35 U.S.C. 154(b) by 36 days.

(21) Appl. No.: 09/873,523

(22) Filed: Jun. 5, 2001

(65) Prior Publication Data

US 2002/0009963 A1 Jan. 24, 2002

(30) Foreign Application Priority Data

Jul. 22, 2000 (DE) .......................................... 100 35 743

(51) Int. Cl.$^7$ ............................................. B24B 19/00
(52) U.S. Cl. ........................ 451/419; 451/420; 451/421
(58) Field of Search ................................. 451/419–421, 451/439, 5, 10; 56/250, 251, 1, 10.1, 10.2 A, 171, 229, DIG. 1, 15

(56) References Cited

U.S. PATENT DOCUMENTS

| 4,843,767 | A | | 7/1989 | Johnson |
| 5,098,027 | A | * | 3/1992 | McClure et al. .............. 56/250 |
| 5,103,622 | A | | 4/1992 | Hall et al. |
| 5,743,073 | A | * | 4/1998 | Paquet ......................... 56/250 |
| 6,430,909 | B1 | * | 8/2002 | Clauss .......................... 56/250 |

FOREIGN PATENT DOCUMENTS

| DE | 40 23 114 | 8/1991 |
| DE | 199 03 153 | 3/2000 |

* cited by examiner

*Primary Examiner*—Lee Wilson

(57) ABSTRACT

A chopper drum includes a plurality of knives distributed along its width and about its circumference. A grinding device is provided for automatically sharpening the knives, with a grinding stone of the grinding device having its movement automatically controlled by a microprocessor, which receives signals from an actual shape sensor and compares it with a stored desired shape and generates control signals, such that it shapes the profile of the chopper drum to at least approximate the desired shape.

11 Claims, 5 Drawing Sheets

GRINDING DEVICE

FIELD OF THE INVENTION

The invention concerns a grinding device with a grinding stone for sharpening at least on knife of a chopper arrangement, and more specifically relates to a control for a movement arrangement for moving the grinding stone.

BACKGROUND OF THE INVENTION

During the operation of a forage harvester, the knives fastened to the chopper drum wear over time. It is possible that individual knives wear to differing degrees. While the knives at a given zone around the circumference of the chopper drum, as a rule, wear approximately at a uniform rate, the wear across the width of the chopper drum can differ considerably. Therefore, the diameter of the enveloping circles described by the cutting edges of the knives can vary in the axial direction of the shaft of the chopper drum. A cylindrical or slightly concave shape is desirable, in order to simplify an automatic repositioning of the shearbar or to make that possible, depending on the repositioning system. A parallel and exact repositioning of the shearbar to the circumference of the chopper drum is indispensable for an effective chopping process.

One attempt at automating the sharpening of chopper drum knives, so as to result in a cylindrical drum profile instead of undesirable barrel or hour glass shaped drum profiles, and for repositioning the shearbar is disclosed in U.S. Pat. No. 4,843,767, granted on Jul. 4, 1989 to Johnson. This patent discloses a grinding stone moving arrangement, including a guide rail and stone carrier mounted for movement as a unit toward and away from the chopper drum by a first electric motor, with the stone carrier being swept across the chopper drum by operation of a second electric motor. These electric motors, and an additional pair for repositioning the shear bar, are controlled by a microprocessor including a programmable memory and to which signals from knock sensors mounted at the shearbar are sent for use in determining in-feed and sweep movements of the grinding stone as well as for use in determining how far to reposition the shearbar. The microprocessor also receives information by which the operator is informed of the instant lateral position of the grinding stone by the sequential lighting of a series of LEDs during its sweep movements. However, with this and other known grinding devices, there is no provision for equalizing the deviations in the diameter of the chopper drum along the length of the drum during the grinding process without manually measuring the chopper drum and subsequently grinding away a sufficient amount.

U.S. Pat. No. 5,103,622, granted to Hall et al. on Apr. 14, 1992 discloses a grinding arrangement wherein the grinding stone is mounted to a carrier that is guided for moving adjacent the cylinder described by the rotating knives of the chopper drum. The grinding stone is mounted to a holder formed in part by a screw having a ratchet wheel at its upper end which engages a trip member, during each cycle of the carrier across the width of the chopper drum, so as to index the screw and move the grinding stone a small increment towards the chopper drum. The guide rail for guiding the carrier is shaped so as to result in the chopper drum being sharpened to a more true cylindrical shape.

DE 40 23 114 A describes a process to determine the sharpness of chopper knives, in which the sharpness of the chopper knives is measured by a magnetic sensor attached to the grinding device. By moving the grinding device with the sensor attached thereto transverse to the chopper drum, the sharpness of the chopper knives can be measured across the width of the chopper drum. The values measured by means of the sensor are used to inform the operator of the forage harvester when the chopper knives must be ground.

DE 199 03 153 C proposes that the wear condition of individual chopper knives be determined by the measurement of the load on the shearbar opposite to the direction of flow of the crop and transverse to the direction of flow of the crop. In case the measured wear condition indicates dull knives, the operator is given a corresponding information, or the flow of the crop is automatically stopped, or the shearbar is repositioned, or a grinding process is initiated.

The problem underlying the invention is seen in the need to make available an improved grinding device which results in the sharpened knives having a desired spacing from a fixed shearbar or counter knife for good chopping results.

SUMMARY OF THE INVENTION

According to the present invention there is provided an improved grinding device.

An object of the invention is to provide a grinding device which takes into account irregularities in the shape of the circumference of a chopping drum along its length or rotational axis.

A more specific object of the invention is to provide a control for a grinding device which includes a memory for storing a value representing a target shape of the profile of the chopping drum and for retrieving signals from a measuring arrangement of the actual shape of the chopping drum and comparing them with the target shape and controlling the grinding device in view of this comparison so as to shape the chopping drum profile to at least approximate that of the target shape.

These and other objects will become apparent from a reading of the ensuing description together with the appended drawing.

DESCRIPTION OF THE PREFERRED EMBODIMENT

Figure 2:
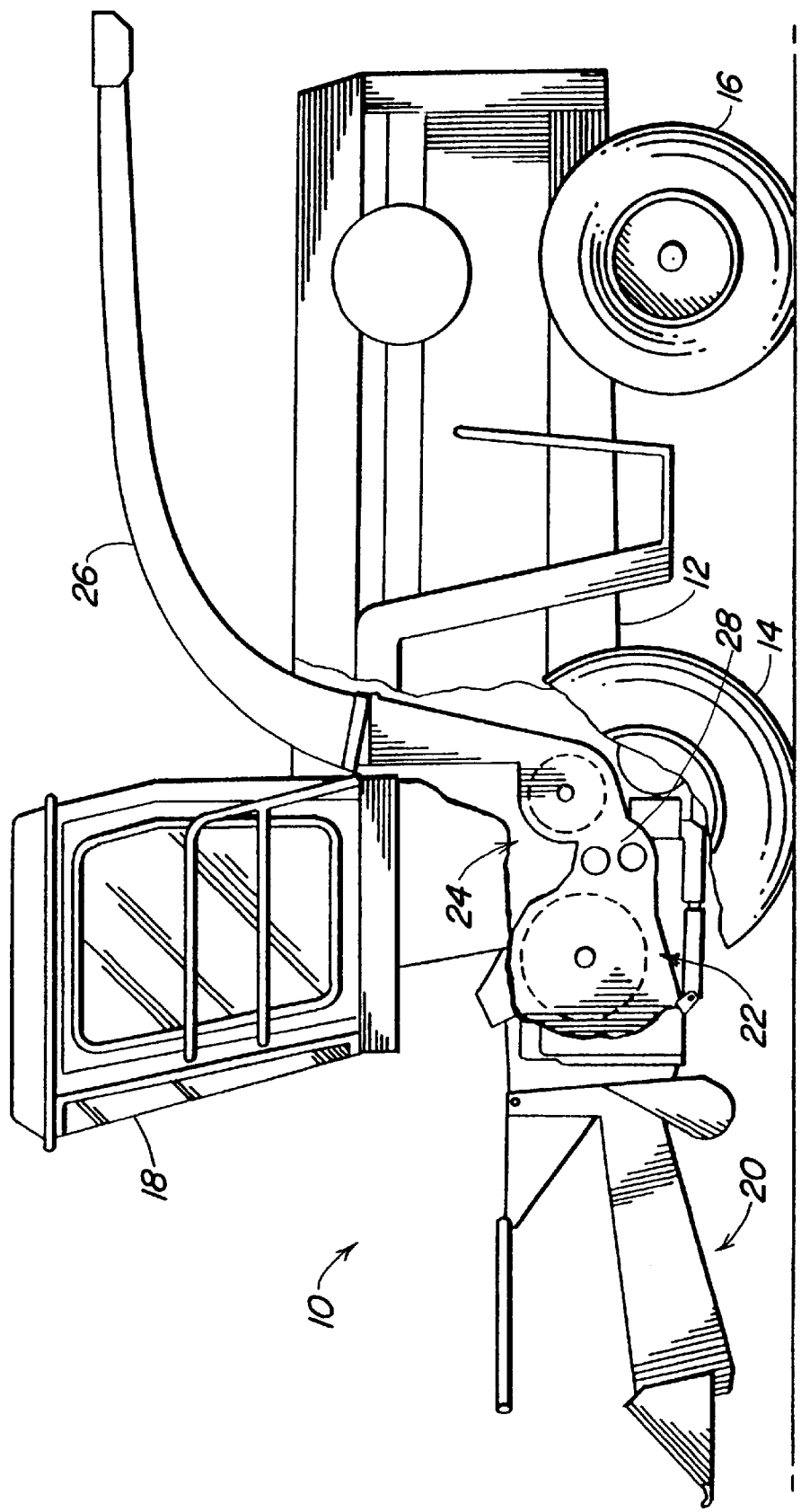
FIG. 2 is a left side view of a harvesting machine equipped with a chopper drum of the type with which the grinding arrangement of the present invention is particularly adapted for use.

Referring now to FIG. 2, there is shown a harvesting machine 10 here shown in the form of a self-propelled forage harvester. The harvesting machine 10 includes a main frame 12 that is supported on front and rear sets of wheels 14 and 16. The harvesting machine 10 is controlled by an operator from an operator's cab 18 from which a crop recovery arrangement or pick-up arrangement 20 that is in the view of the operator. Crop, for example, corn, grass or the like, taken up from the ground by the crop recovery arrangement 20 is conducted to a chopper drum 22 which chops it into small pieces and delivers it to a discharge blower 24, which in turn delivers the crop to a rotatable discharge duct 26 that deposits the crop in an accompanying trailer. Between the chopper drum 22 and the blower 24 is a postchopper or kernel processor 28 which, when corn is being harvested, acts to further reduce the crop and conduct it tangentially to the blower 24.

Figure 3:
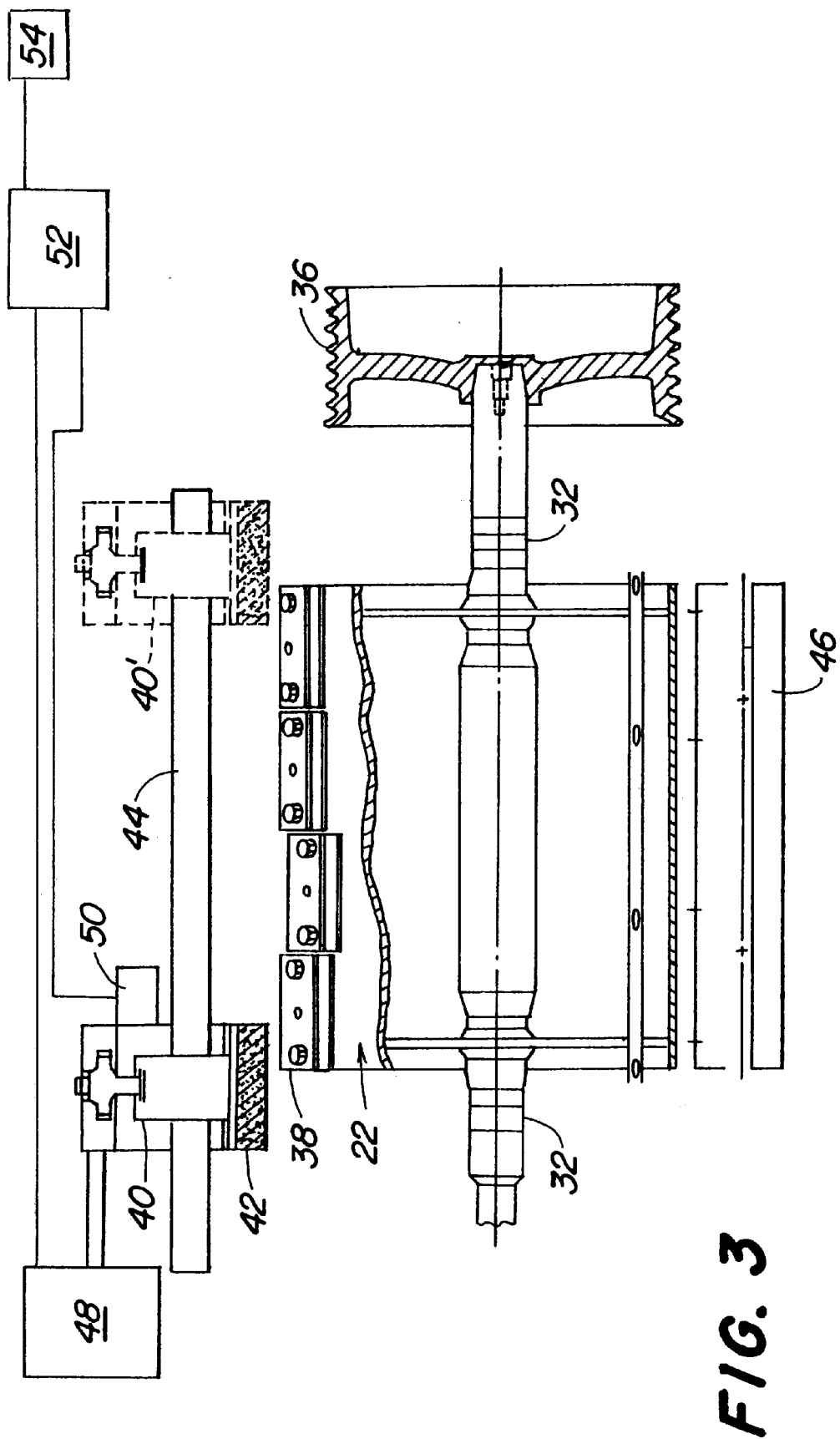
FIG. 3 is a somewhat schematic front view of a first embodiment of a grinding arrangement.

Referring now to FIG. 3, it can be seen that the chopper drum 22 includes a number of knives 38 distributed over its width and circumference which interact with a rigid shearbar 46 to chop crop taken up by the crop recovery arrangement 20. The chopper drum 22 includes a central shaft 32 that can be driven in rotation through a belt pulley 36, at its one end, and belts, not shown, extending from an engine-driven pulley of the harvesting machine 10.

In order to be able to sharpen knives 38 after a certain operating time, without having to disassemble the individual knives 38 or the entire chopper drum 22, a grinding device is provided, above the chopper drum 22 close to the enveloping cylinder described by the knives 38. The grinding device includes a grinding stone retainer 40, an associated grinding stone 42 and an axle or guide rod 44 extending parallel to the chopper drum shaft 32 and on which the grinding stone retainer 40 is supported in bearings, free to slide.

If the knives 38 are to be sharpened, the chopper drum 22 is brought into rotation, as a rule in the opposite direction of rotation and with reduced rotational speed compared to normal chopper operation. The grinding stone retainer 40 with the attached grinding stone 42 is moved by means of a movement arrangement 48, indicated only schematically, from a rest or park position (not shown) in which it is arranged alongside the chopper drum 22 to traverse across the entire width of the chopper drum 22. At that time, the underside of the grinding stone 42 is in contact with the knives 38 and sharpens them. During the grinding process, the grinding stone 42 is traversed several times across the width of the chopper drum 22. The end points of this sliding movement are illustrated in FIG. 3 by the grinding stone retainers with the number call-outs 40 at the left reversal point and 40' at the right reversal point. Between the traversing movements, an in-feed of the grinding stone 42 can be performed, that is, a minute movement of the grinding stone 42 towards the knives 38. In the embodiment shown, a mechanical element in the form of a ratchet gear (not shown) is used for this step, that interacts with a stationary element when one or both extreme reversal points of the grinding stone retainer 40 are reached (the above-described U.S. Pat. No. 5,103,622 discloses an example of such a ratchet gear and stationary element). The rotation of the mechanical element is converted into a sliding movement by means of a thread, so that the grinding stone 42 is fed in towards the chopper drum 22. If the grinding stone 42 traverses only a restricted central region between the reversal points, then an in-feed will not occur since the ratchet gear does not come into contact with the stationary element (s). A grinding of this type without in-feed is appropriate for the smoothing that follows the grinding process. The movement arrangement 48 of the grinding device is controlled by a control arrangement 52, shown schematically in FIG. 3, that controls the sweeping movement of the grinding stone 42, i.e., its sliding movement across a guide structure, including the guide rod 44, by means of the movement arrangement 48 as well as the in-feeding, in the manner described above. The control arrangement 52 is a programmable computer or microprocessor that is continuously supplied with a signal representing the immediate position of the grinding stone 42, which can be performed by a corresponding sensor, not shown in the drawing, or by an information stored previously in the control arrangement 52 into which position it has brought the movement arrangement 48. For this purpose, for example, the number of impulses that are delivered to a stepper motor of the movement arrangement 48 can be stored in memory. Furthermore, the control arrangement 52 can control the drive for the chopper drum 22.

It should be noted that the feeding could be performed by a separate motor, in particular an electric or a hydraulic motor, that should be connected to the control arrangement 52. In place of feeding the grinding stone 42 by indexing a screw, the entire grinding stone retainer 40 and guide rail 44 could be moved towards the chopper drum 22, for example, in the manner disclosed in the above-described U.S. Pat. No. 4,843,767.

The control arrangement 52 is connected with a memory 54 with a knock sensor 50 attached to the grinding stone retainer 40, that is used as a measurement arrangement for sending signals representative of the shape of the periphery of the chopper drum at locations along its axis.

Figure 4:
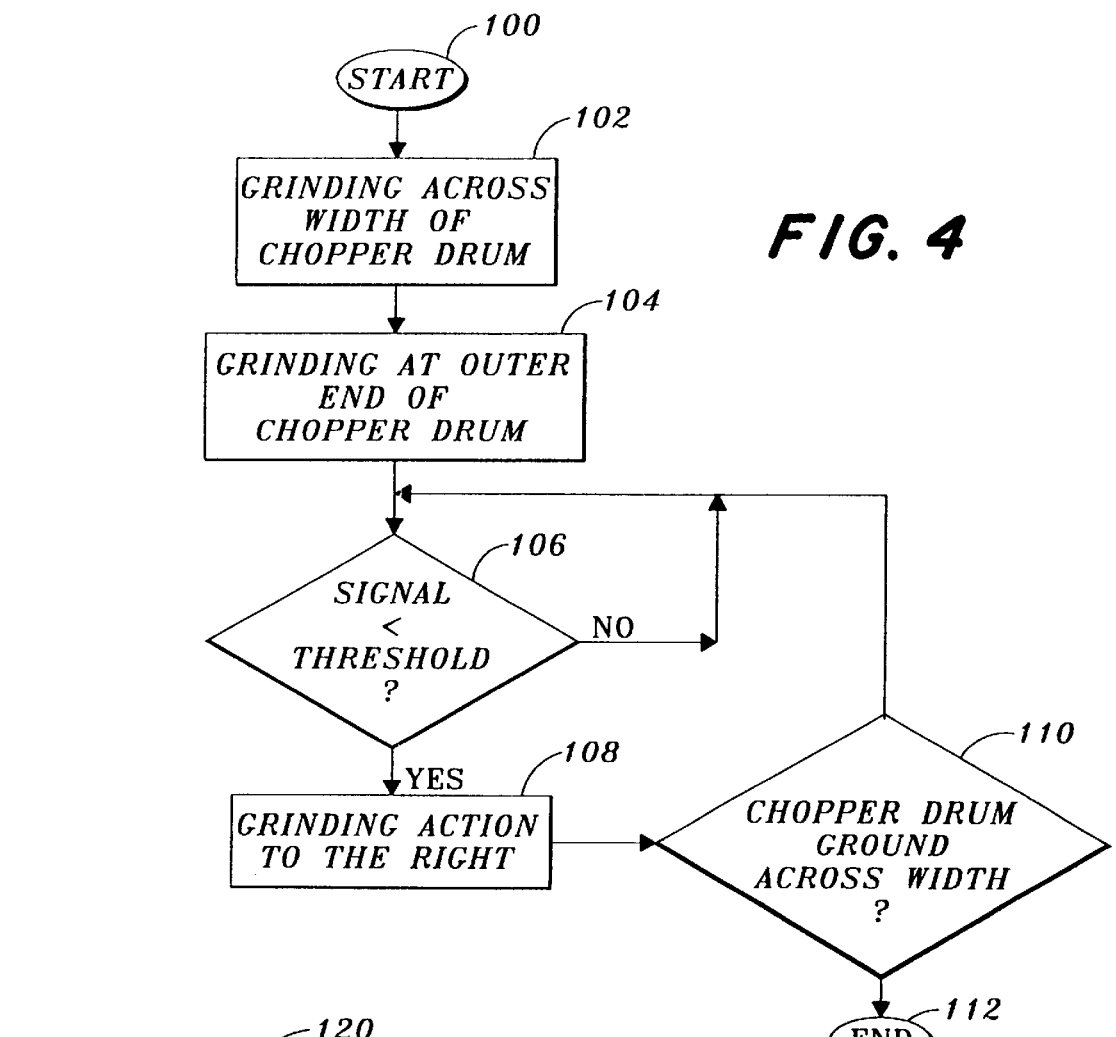
FIG. 4 is a flow diagram illustrative of the grinding process.

A grinding process runs as shown in FIG. 4. Specifically, after beginning of the grinding process, (step 100) the control arrangement 52 orders the grinding stone 42 to be moved (step 102) by the movement arrangement 48 to traverse the entire width of the chopper drum 22 and to traverse again into the original position. Thereby the grinding stone 42 can remain in the position into which it was brought during the previous grinding process or, if necessary, to be fed in toward the chopper drum 22. Step 102 can serve to determine whether a feeding in of the grinding stone 42 is required. This is the case if at a minimum at one location on the chopper drum 22 no signal, or only a relatively small signal, is generated by the knock sensor 50. In this case, there is a dent, depression or the like in the knives 38 that cannot be equalized without in-feeding. Step 102 can also be omitted especially when following it a further check is performed to determine whether the grinding process was successful.

When the width of the chopper drum 22 is traversed, the knock sensor 50 attached to the grinding stone retainer 40 generates a signal that is a function of the spacing between the cutting edges of the knives 38 and the grinding stone 42. The control arrangement 52 is supplied over an appropriate analog-digital converter with information on the amplitude of this signal.

Figure 1A:
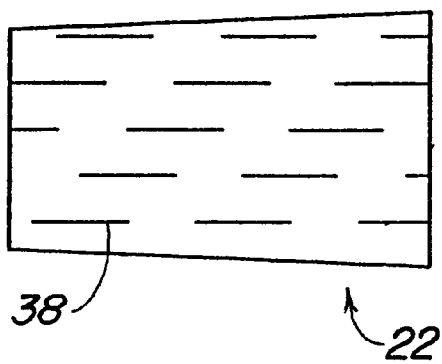
FIGS. 1a–1d respectively show schematic views of chopper drums with knives worn to produce various circumferential profiles.
Figure 1B:
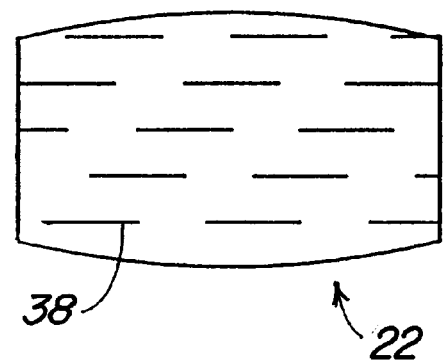
Figure 1C:
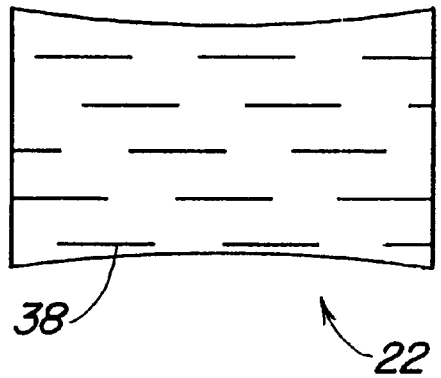
Figure 1D:
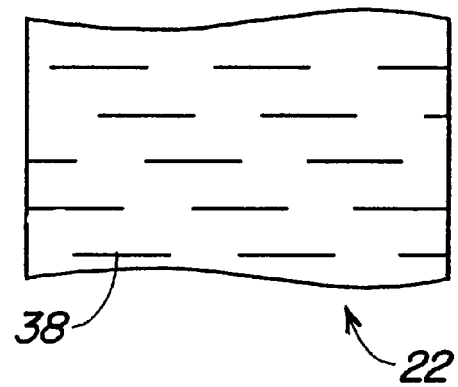

In the chopper drum 22 that exhibits the shape shown in FIG. 1a, a signal designated in the following as a spacing signal which contains an information on the spacing would decline from left to right. Thereby the signal delivered by the knock sensor 50 would increase. In the chopper drum 22 shown in FIG. 1b, the shape can be the result of the form of the crop supplied or of excessive dwell times at the ends of the traversing movement of the grinding stone 42 over the width of the chopper drum 22, so that the knives are ground down more there than in the center, the spacing signal would become continuously smaller the more the grinding stone 42 approaches the center of the chopper drum 22. If the shape is caused by excessive dwell times at the ends of the chopper drum 22, so that it is recognized by the control arrangement 52 during the grinding, the dwell times stored in the memory 54 can be shortened automatically. The shape of the chopper drum shown in FIG. 1c results in the greatest spacing at the center, and the shape shown in FIG. 1d results from a spacing that varies in an irregular manner across the width. The shape of FIG. 1c can be the result of dwell times at the ends of the chopper drum 22 that are too short. If this is recognized by the control arrangement 52 during the grinding, the dwell times stored in the memory 54 can be automatically lengthened. However the shapes shown in FIGS. 1c and 1d can be caused by an irregular supply of crop or by a defective shearbar 46.

In the grinding process shown in FIG. 4, the grinding stone 42 is at first not fed in further. In step 104, the grinding stone 42 is brought by the movement arrangement 48 into a first position at the chopper drum 22, as a rule at the left or the right outer position. It remains in this position until the knock sensor 50 generates an output signal that corresponds to a desired spacing between the shaft 32 and the cutting edges of the knives 38, so that an adequate sharpening of the components of the knives 38 interacting with the grinding stone 42 is attained. Therefore, step 106 questions whether the signal of the knock sensor 50 is less than the threshold value. If the answer is "no", step 106 follows, otherwise step 108. There the grinding stone 42 is moved by the movement arrangement 48 over a distance corresponding to its width further to the left or the right and grinds the knives 38 there. Step 110 follows which questions whether the chopper drum 22 has already been operated on over its entire width. If the answer is "no", step 106 follows, otherwise the process ends in step 112. Therefore the grinding stone 42 always remains standing at one location of the chopper drum 22, until the knock sensor 50 at each point delivers the desired output signal. These steps are repeated until the entire width of the chopper drum 22 has been processed. In this way, there is assurance that the chopper drum 22 has been brought into a cylindrical shape. When such a shape exists and the grinding stone 42 traverses the width of the chopper drum 22, a constant output signal is produced by the knock sensor 50 over the width of the chopper drum 22. In the case where the chopper drum 22 has a particularly small radius at a few locations, so that the knock sensor 50 detects no contact between the knives 38 and the grinding stone 42, an in-feed of the grinding stone 42 and repetition of the grinding process over the entire width of the chopper drum 22 can be performed. As a rule, the process described is repeated with opposite direction of movement of the grinding stone 42 and/or performed repeatedly. At the conclusion of the grinding process a normal grinding and/or smoothing over the entire width of the chopper drum 22 can be performed in the manner known in itself. Finally, the grinding stone 42 is brought into its park position.

Figure 5:
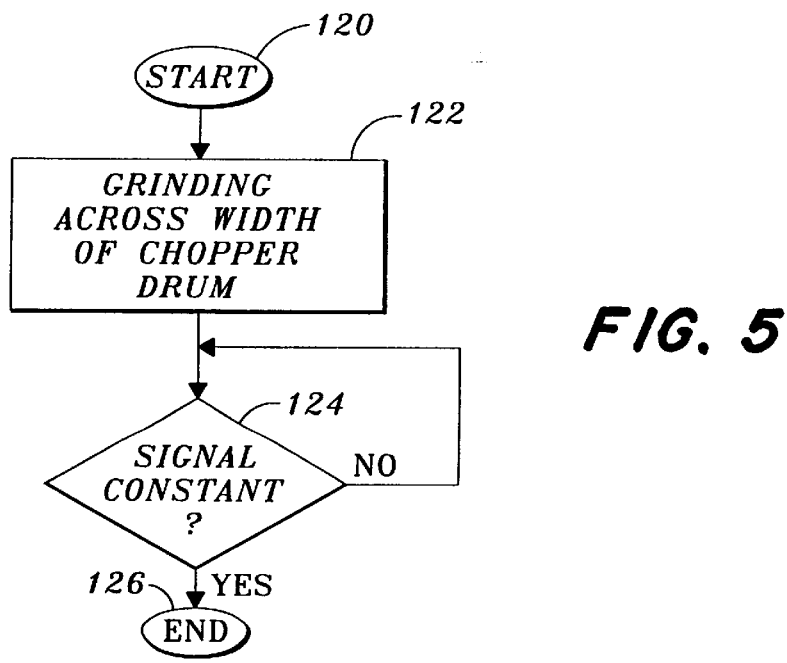
FIG. 5 is a flow diagram illustrative of another grinding process.

An alternative mode to the above, shown in FIG. 5, operates in such a way that the grinding stone 42 traverses the entire width of the chopper drum 22 until a constant spacing between the shaft 32 and the cutting edges of the knives 38 is established. The control arrangement 52 recognizes from the output signal of the knock sensor 50 whether a constant spacing between the shaft 32 and the cutting edges of the knives 38 has been reached, and accordingly can terminate the grinding process. In this mode, feeding in of the grinding stone 42 can also be performed, if at one or more places of the chopper drum 22 no contact between the grinding stone 42 and the knives 38 is detected by the knock sensor 50. Therefore, the grinding process operates in such a way that after the start in step 120 the grinding stone 42 traverses the width of the chopper drum 22 in step 122. In step 124, a determination is made whether the signal from the knock sensor 50 is constant. If that is not the case, step 122 follows, otherwise the process ends with step 126.

To determine the success or since the grinding stone 42 wears during the grinding, which can lead to an unsatisfactory result for the grinding process, the control arrangement can, after the smoothing following a normal grinding process, once more traverse the grinding stone retainer 40 across the width of the chopper drum 22 and determine the spacing between the shaft 32 and the cutting edges of the knives 38 by means of the knock sensor 50. If the shape of the cutting edges of the knives 38 as determined thereby is unsatisfactory, a new grinding process is performed in the manner described above.

At the conclusion of the two grinding modes, a normal grinding and/or smoothing of the entire chopper drum 22 can be performed.

Figure 6:
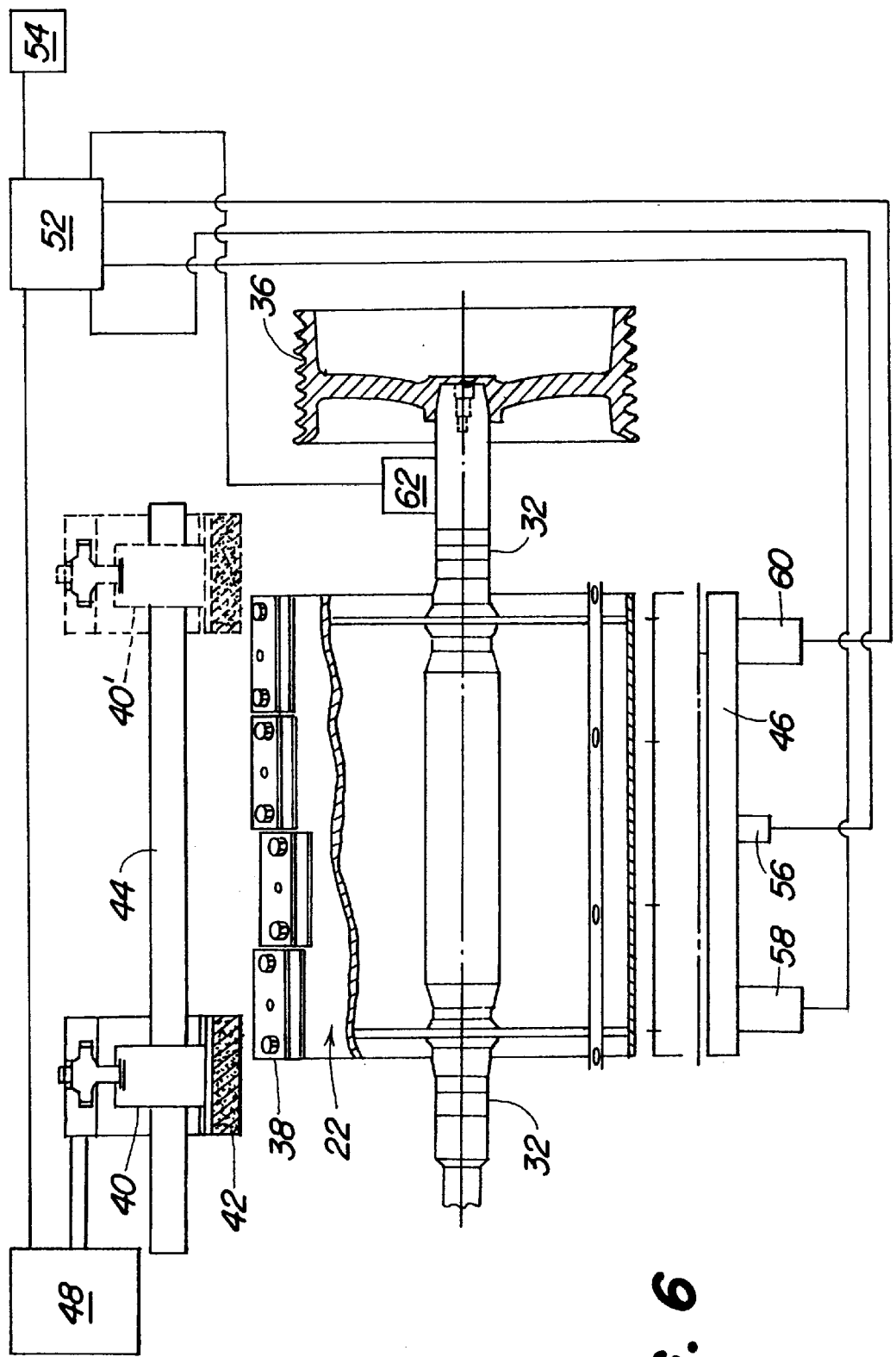
FIG. 6 shows a front view of a second embodiment of the grinding arrangement.

FIG. 6 shows a second embodiment of a grinding device according to the invention. Components that correspond to those of the first embodiment are identified by the same number call-outs. There is a difference in regard to the measurement arrangement that includes a magnetically operating sensor 56 at the shearbar 46 in place of the knock sensor 50 at the grinding stone retainer 40. The shearbar 46 can be moved by means of servo motors 58 and 60 relative to the chopper drum 22. The servo motors 58 and 60 are controlled by the control arrangement 52, preferably synchronously, in order to bring the shearbar 46 into a position appropriate for the operation of the chopper drum 22. The magnetically operating sensor 56 provides information on the spacing between the shearbar 46 and the cutting edge of a knife 38 rotating past the shearbar 46. Such a sensor is described in EP 0 9434 888 A, whose teaching is incorporated into the present disclosure by reference. During the grinding, the shearbar 46 is brought into a position by the control arrangement 52 by means of the servo motors 58 and 60 in which the magnetically operating sensor 56 is in a position to generate an appropriate output signal. Furthermore, the control arrangement 52 is connected with an angle sensor 62 that provides an information about the actual angular position of the shaft 32 relative to a reference point. On the basis of the signal generated by the angle sensor 62, the control arrangement 52 is in a position to recognize which of the knives 38, arranged in each case at another angle on the shaft 32, is just then located in the vicinity of the shear bar 46. In this way, a correlation is possible between the measured value of the spacing provided by the magnetically operating sensor 56 and the axial position of the knife 38. The control arrangement 52 controls the movement arrangement 48 as a function of this information in the manner described above.

Having described the preferred embodiment, it will become apparent that various modifications can be made without departing from the scope of the invention as defined in the accompanying claims.

What is claimed is:

1. A combination of a shearbar, a chopper arrangement including a plurality of knives distributed over its width and circumference for rotation about an axis and including respective cutting edges operating against said shearbar for chopping crop, and a grinding device mounted close to the chopper arrangement and including a grinding stone mounted to a carrier coupled to a movement arrangement for movement toward, and axially along, said chopper drum for periodically sharpening said knives, comprising: a control arrangement for said moving arrangement; said control arrangement including a microprocessor having a memory in which is stored information corresponding to a desired target shape described by cutting edges of said knives; a measurement arrangement for providing a signal that contains information about and actual shape described by said cutting edges of said knives and sending a signal representative of said actual shape; and said control arrangement comparing the actual and desired shapes and sending control signals representing a difference of actual to desired shapes to said moving arrangement so as to cause said grinding stone to be moved such as to result in said cutting edges of said knives being ground so that they describe a shape at least closely approximating said desired target shape.

2. The combination defined in claim 1 wherein said chopper arrangement includes a drum fixed to a shaft located along said axis; said measurement arrangement sensing a radial distance between respective cutting edges of said knives and said shaft with said information about the shape of said cylinder described by said cutting edges being in the form of information the measured radial distances of said cutting edges from said shaft.

3. The combination defined in claim 1 wherein said target shape is approximately in the shape of a cylinder.

4. The combination defined in claim 1 wherein said control arrangement controls said movement arrangement such that said grinding stone is moved, with respect to time, non-linearly across the width of said chopper arrangement.

5. The combination defined in claim 1, wherein said control arrangement controls said movement arrangement such that the grinding stone in each case remains stationary at one position until the measurement arrangement generates an output signal associated with this position that corresponds to a certain radius of the enveloping circle of the cutting edges of the knives associated with this position, and that said grinding stone is thereafter moved to a further position by said movement arrangement where grinding takes place in a similar manner and so on until the grinding stone is moved across the full width of said chopper arrangement.

6. The combination defined in claim 1 wherein said control arrangement that controls the movement arrangement operates so as to move said grinding stone to continuously traverse said width of said chopper arrangement.

7. The combination defined in claim 1 wherein said control arrangement that controls said movement arrangement causes the grinding stone to be fed in toward said chopper arrangement so as to perform a finishing operation in response said knife edges having been ground so as to describe a shape at least closely approximating said target shape.

8. The combination defined in claim 1 wherein said measurement arrangement generates information based on a spacing between each knife cutting edge and said grinding stone in respective positions wherein the cutting edge of each knife passes said grinding stone.

9. The combination defined in claim 8 wherein said measurement arrangement includes a knock sensor mounted for movement with said grinding stone.

10. The combination defined in claim 1 wherein said measurement arrangement includes a knock sensor mounted at said shearbar.

11. The combination defined in claim 1 wherein said measurement arrangement includes a magnetically operating sensor mounted at said shearbar.

* * * * *